United States Patent [19]

Koizumi et al.

[11] Patent Number: 5,075,697
[45] Date of Patent: Dec. 24, 1991

[54] DUAL POLARIZATION TRANSMISSION SYSTEM

[75] Inventors: Yutaka Koizumi; Shigeki Maeda, both of Tokyo, Japan

[73] Assignee: NEC Corporation, Tokyo, Japan

[21] Appl. No.: 584,012

[22] Filed: Sep. 18, 1990

[30] Foreign Application Priority Data

Sep. 18, 1989 [JP] Japan ................................. 1-242892
May 16, 1990 [JP] Japan ................................. 2-126162
May 17, 1990 [JP] Japan ................................. 2-128059

[51] Int. Cl.$^5$ ..................... H01Q 21/06; H01Q 21/24; H04B 7/10
[52] U.S. Cl. ................................. 342/361; 455/295; 455/296
[58] Field of Search ................. 342/361, 362; 455/295, 455/296

[56] References Cited

U.S. PATENT DOCUMENTS 4,575,862  3/1986  Tahara et al. ..................... 455/296
4,757,319  7/1988  Lankl ................................. 342/361
4,811,021  3/1989  Yoshimoto et al. ................ 342/361
4,992,798  2/2991  Nozue et al. ....................... 342/362

OTHER PUBLICATIONS

T. Ryu et al., "IF Band Cross Polarization Canceler", ICC '84 Links For The Future, IEEE International Conference on Communication, Amsterdam, The Netherlands, May 14, 17, 1984, pp. 1442-1446.

Primary Examiner—Theodore M. Blum
Attorney, Agent, or Firm—Sughrue, Mion, Zinn Macpeak & Seas

[57] ABSTRACT

A dual polarization transmission system for transmitting digital modulated signal each having a particular bandwidth by use of two polarized waves which have the same center frequency and are orthogonal to each other. The receiver side of the system demodulates radio frequency signals sent by a horizontally and a vertically polarized wave and coming in through a receiving antenna into IF signals. From the received signal of one polarization, an interference component of the other polarization generated on the basis of the cross-polar IF signal or demodulated signal is removed.

10 Claims, 7 Drawing Sheets

FIG. 8 ication, heldin Amster-
DUAL POLARIZATION TRANSMISSION SYSTEM

BACKGROUND OF THE INVENTION

The present invention relates to a dual polarization transmission system which transmits digital modulated signals having different bandwidths by radio waves that have the same center frequency and are different in polarization and, more particularly, to the cancellation of cross polarization interference components.

A transmission system of the type described uses a co-channel frequency arrangement in which two radio channels of horizontal polarization and vertical polarization share the same frequencies, and a particular bandwidth is assigned to each polarization. The co-channel frequency arrangement promotes effective use of frequencies without increasing the interference between co-polar channels, compared to an interleave frequency arrangement in which radio channels are alternately arranged on a horizontally and a vertically polarized wave. This type of transmission system is disclosed in U.S. Pat. No. 4,811,021 issued to Yoshimoto and Maeda, Maeda being one of the inventors of the present invention.

A system of the type transmitting signals having the same bandwidth by use of the co-channel frequency arrangement of radio channels on a horizontally (H-) and a vertically (V-) polarized wave is also known in the art. In relation to this type of system, there has been proposed an implementation for cancelling cross polarization interference, i.e., the interference between a horizontally and a vertically polarized wave by Ryu, Tahara and Noguchi in the paper entitled "IF BAND CROSS POLARIZATION CANCELER" reported in ICC '84 LINKS FOR THE FUTURE, IEEE International Conference on Communication, heldin Amsterdam, The Netherlands, May 14–17, 1984. (IEEE, 1984). It is not practicable, however, to apply the cross polarization interference cancellation (XPIC) for use with the co-channel frequency arrangement in which a horizontally and a vertically polarized wave have the same bandwidth directly to the co-channel type transmission system which transmits signals having different bandwidths described above.

Specifically, an interference canceller for cancelling the interference between a H- and a V- polarized wave has a transversal filter therein. In the co-channel arrangement wherein the radio channels share the same bandwidth, the tap delay of the transversal filter is selected to be the reciprocal of the symbol rate $f_s$ (equal to bandwidth) of signals to be transmitted. XPIC using such a transversal filter is not directly applicable to the dual polarization transmission system disclosed in the '021 patent, since the latter assigns a different symbol rate to each of a H- and a V- polarized wave.

SUMMARY OF THE INVENTION

It is therefore an object of the present invention to provide a dual polarization transmission system capable of transmitting digital modulated signals having different bandwidths by different radio waves having the same center frequency, while surely cancelling cross polarization interference components.

According to the invention, there is provided a dual polarization transmission system transmitting digital modulated signals having two different bandwidths by two orthogonal radio waves which have the same center frequency and are orthogonal in polarization, the system comprising, at a receiver side, interference cancelling means for removing interference components leaked from a cross-polar wave from a co-polar received signal.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENTS

Figure 1:
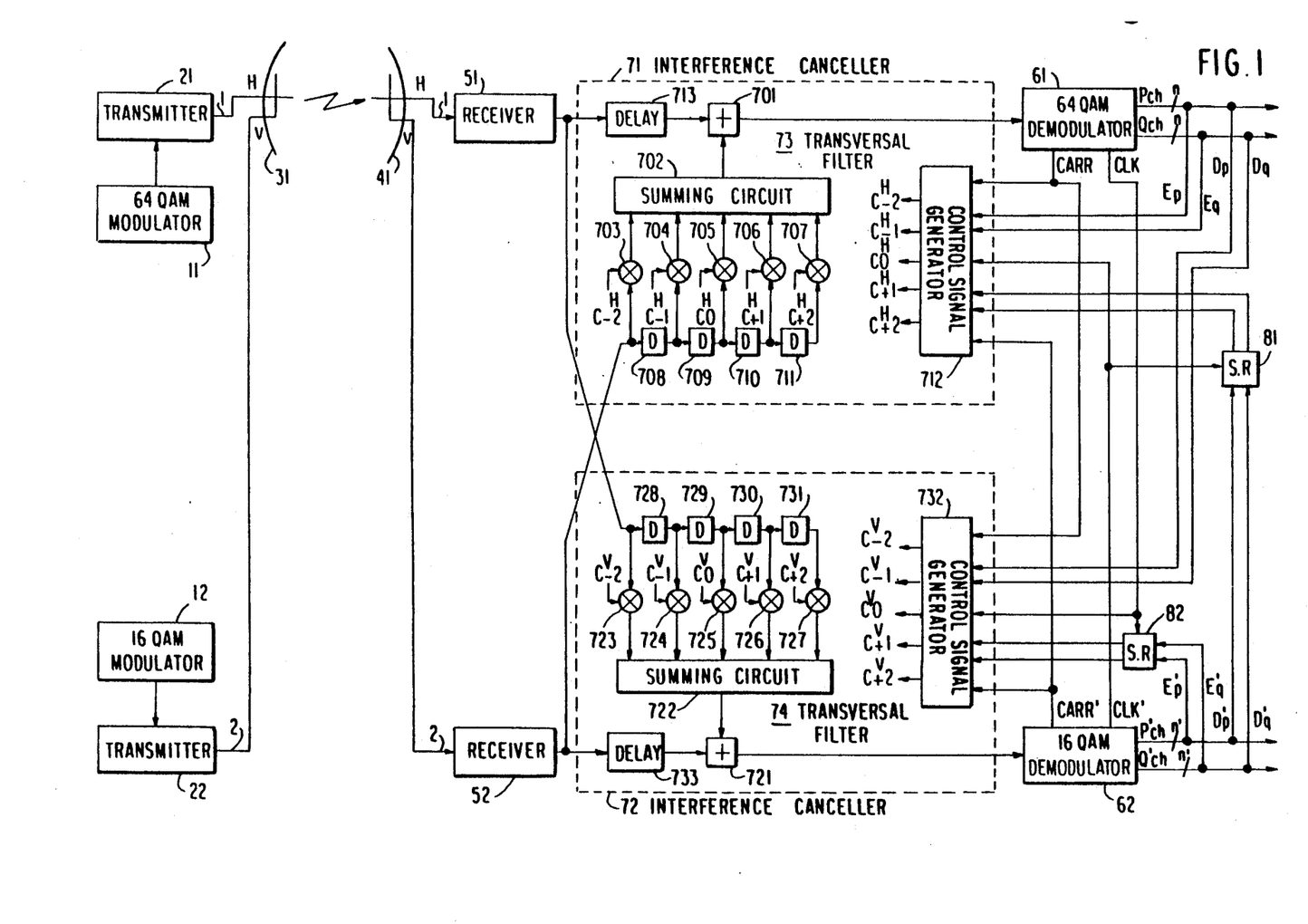
FIG. 1 is a block diagram schematically showing an embodiment of the dual polarization transmission system in accordance with the present invention.

Referring to FIG. 1 of the drawings, a dual polarization transmission system embodying the present invention is shown. In FIG. 1, the transmitter side has a 64 QAM modulator 11, a 16 QAM modulator 12, transmitters 21 and 22, and a transmitting antenna 31. The receiver side has receiving antenna 41, receivers 51 and 52, a 64 QAM demodulator 61, a 16 QAM demodulator 62, interference cancellers 71 and 72, and shift registers 81 and 82.

Figures 2, 3:
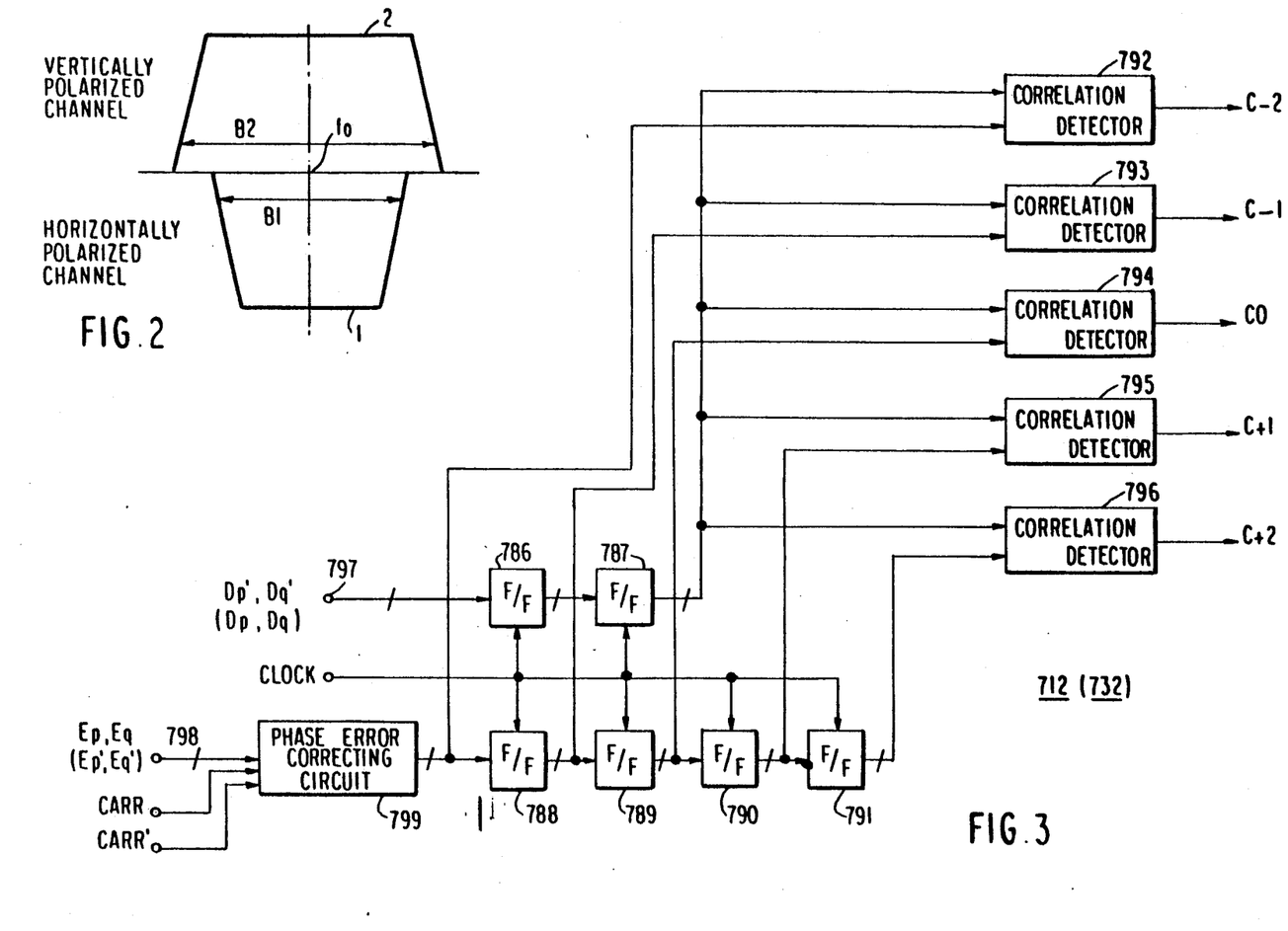
FIG. 2 is a view representative of a frequency arrangement particular to the illustrative embodiment.
FIG. 3 is a block diagram schematically showing a specific construction of a control signal generator included in the embodiment and having a phase error correcting circuit therein.

At the transmitter side, the 64 QAM modulator 11 produces a 64 QAM modulated signal (IF signal, center frequency $f_{IF}$) having a bandwidth $B_1$ (=symbol rate $f_{S1}$). The transmitter 21 converts the 64 QAM modulated signal into a radio frequency signal whose center frequency is $f_0$. This radio frequency signal is applied to the horizontal polarization (H-polar) side of the transmitting antenna 31. On the other hand, the 16 QAM modulator 12 outputs a 16 QAM modulated signal (IF signal, center frequency $f_{IF}$) having a bandwidth $B_2$ ($B_2 \neq B_1$, $B_2$=symbol rate $f_{S2}$). The transmitter 22 associated with the modulator 12 converts the 16 QAM modulated signal into a radio frequency signal whose center frequency if $f_0$, and the converted signal is applied to the vertical polarization (V-polar) side of the antenna 31. The antenna 31 radiates radio waves having been respectively polarized horizontally and vertically in the bandwidths $B_1$ and $B_2$ and at the center frequency $f_0$. As a result, the arrangement of radio channels 1 and 2 is implemented, as shown in FIG. 2.

The symbol rate $f_{S1}$ of the radio channels 1 is equal to the bandwidth $B_1$. Assuming that the bit rate is $\alpha$ Mbit/s, then $f_{S1} = B_1 = \alpha/6$ MHz. The radio channels 2 also have a bit rate of $\alpha$ Mbit/s so that $f_{S2} = B_2 = \alpha/4$ MHz.

At the receiver side, the radio frequency signal coming in through the H-polar side of the antenna 41 and having the bandwidth $B_1$ is converted into an IF signal (center frequency $f_{IF}$) by the receiver 51. Likewise, the radio frequency signal coming in through the V-polar side of the antenna 41 is converted into an IF signal by the receiver 52. The IF signal from the receiver 51 is applied to the interference canceller 71 to cancel interference components from the cross-polarized wave, i.e. V-polarized wave. The output of the circuit 71 free from the interference components is fed to the 64 QAM demodulator 61. In response, the demodulator 61 performs orthogonal detection. Then the demodulator 61 discriminates the orthogonal detected signal to produce as a baseband digital signal, a 3-bit regenerated data signal and an 1-bit error signal representative of a discrimination error in each of the P and Q channels as a baseband digital signal. In the same manner, the interference canceller 72 removes from the IF signal outputted by the receiver 52 interference components from the cross-polarized wave, i.e. H-polarized wave. The 16 QAM modulator 62 affects orthogonal detection and then discrimination with the resulting output of the interference canceller 72, whereby a 2-bit regenerated data signal and a 1-bit error signal are produced from each of the P and Q channels as a baseband digital signal.

The interference canceller 71 is made up of a delay circuit 713, a transversal filter 73, a control signal generator 712, and an adder 701. The transversal filter 73 has delay circuits 708, 709, 710 and 711, 5-tap weighting circuits 703, 704, 705, 706 and 707, and a summing circuit 702. Adapted to set a tap delay, the delay circuits 708 to 711 are connected in series and each has the reciprocal $1/n \times B_2$ (n being an integer) of an integral multiple of the bandwidth assigned to the cross-polar side, i.e. V-polar side. The output of the receiver 52 is applied to the delay circuit 708. Applied to the weighting circuits 703 to 707 are respectively the output of the receiver 52 and the outputs of the delay circuits 708 to 711. In response, the weighting circuits 703 to 707 delivers to the summing circuit 702 weighted signals each being proportional to a respective one of control signals $C_{-2}{}^H$, $C_{-1}{}^H$, $C_0{}^H$, $C_{+1}{}^H$ and $C_{+2}{}^H$ which are outputted by the control signal generator 712. The output of the transversal filter 73 is added by the adder 701 to the IF signal from the receiver 51 which is routed through a delay circuit 713 which compensates for the delay particular to the transversal filter 73. The output of the adder 701 which is free from the cross polarization interference component is applied to the 64 QAM demodulator 61. The delay of the delay circuit 713 is indispensable in compensating for the delay of the transversal filter 73 and thereby setting up the timing at the adder 701.

The control signal generator 712 receives an IF band carrier CARR ($f_{IF}$ MHz) recovered by the 64 QAM demodulator 61, 1-bit error signals Ep and Eq representative of a discrimination error at the 64 QAM demodulator 61, an IF band carrier CARR' ($f_{IF}$ MHz) recovered by the 16 QAM demodulator 62, a recovered clock signal CLK' ($f_{S2}$), and quadrant detection signals D'p and D'q which are, for example, the most significant bits (MSBs) of the regenerated data signals subjected to orthogonal detection by the carrier CARR'. At this instant, the quadrant detection signals D'p and D'q from the cross-polarized side, i.e., from the 16 QAM demodulator 62 has been delayed by the shift register 81 which operates at the timings of the recovered clock signal CLK' of the cross-polarized side, i.e., the 16 QAM demodulator 62. This is successful in compensating for the difference in delay time between the 64 QAM demodulator 61 and the 16 QAM demodulator 62 (i.e., difference in delay characteristic between roll-off filters built in the individual demodulators).

Figure 4:
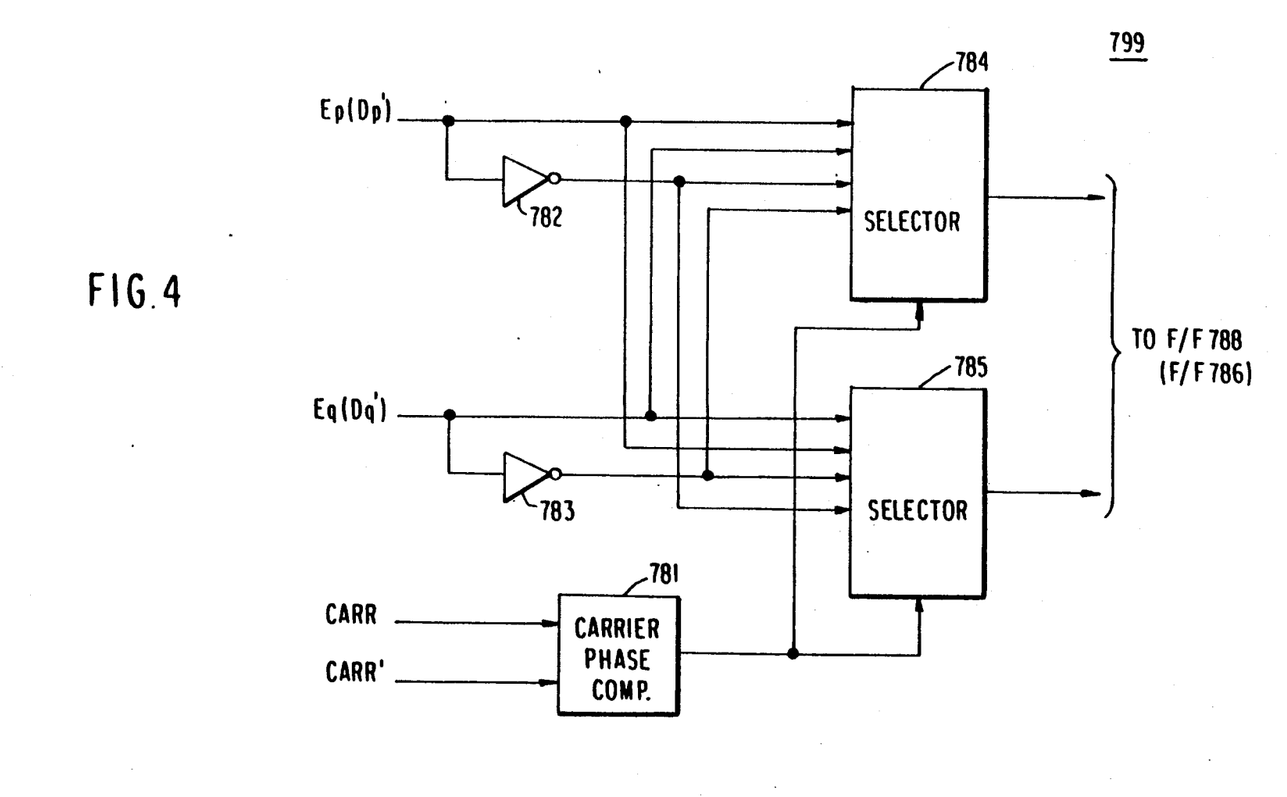
FIG. 4 is a schematic block diagram showing a specific construction of the phase error correcting circuit.

A reference will be made to FIGS. 3 and 4 for describing a specific construction of the control signal generator 712. As shown in FIG. 3, the carrier CARR and the error signals Ep and Eq from the 64 QAM demodulator 61 and the carrier CARR' from the 16 QAM demodulator 62 are applied to a phase error correcting circuit 799. The phase error correcting circuit 799 corrects the difference in phase between the quadrant detection signals D'p and D'q and the error signals Ep and Eq ascribable to the phase difference between the carriers CARR and CARR'. More specifically, the signals propagated in orthogonal polarizations are reproduced by the carriers of the individual demodulators. Therefore, should a difference in phase exist between the individual carriers at the time of regeneration, the interference components from the orthogonal polarized sides and the signal components effected by the interference would be regenerated in different phases. This difference in phase has to be corrected. As shown in FIG. 4, the phase error correcting circuit 799 has a carrier phase comparator 781, inverters 782 and 783, and selectors 784 and 785. The carrier phase comparator 781 compares the phases of the carrier recovered by the 64 QAM and 16 QAM demodulators 61 and 62, respectively, and feeds control signals to the selectors 784 and 785 on the basis of the result of comparison. The error signals Ep and Eq from the 64 QAM demodulator 61 and inverted signals $\overline{Ep}$ and $\overline{Eq}$ from inverters 782 and 783 are applied respectively to the selectors 784 and 785. In response, the selectors 784 and 785 operate according to the control signals from the carrier comparator 781, as shown in Table below.

| PHASE DIFFERENCE | 0 | $\pi/2$ | $\pi$ | $3/2\pi$ |
|---|---|---|---|---|
| SELECTOR 782 OUTPUT | Ep | $\overline{Eq}$ | $\overline{Ep}$ | Eq |
| SELECTOR 783 OUTPUT | Eq | Ep | $\overline{Eq}$ | $\overline{Ep}$ |

In the above Table, $\overline{Ep}$ and $\overline{Eq}$ are representative of the opposite phases of Ep and Eq, respectively.

Referring again to FIG. 3, the control signal generator 712 is made up of flip-flops 786 to 791 operated by the clock signal which is reocvered by the 16 QAM demodulator 62, and correlation detectors 792 to 796 each having an integrator thereinside. The flip-flops 788 to 791 are connected in series. The error signals from the phase correcting circuit 799 are applied to the flip-flop 788. The quadrant detection signals Dp' and Dq' are fed to one input of the correlation detectors 792 to 796 via the flip-flops 786 and 787, while the branched output signals of the phase error correcting circuit 799 and the outputs of the flip-flops 788 to 791 are applied to the other input. The correlation detectors 792 to 796 produce respectively weighting control signals $C_{-2}$, $C_{-1}$, $C_0$, $C_{+1}$ and $C_{+}$ each being representative of a correlation between the error signal of the co-polar side and the quadrant detection signal of the cross-polar side. More specifically, by determining the correlations between the error signals of the co-polar side and the quadrant detection signals of the cross-polar side, the correlation detectors 792 to 796 estimate interference components from the cross-polar side remaining in the output of the adder 701. By such estimation, the tap coefficient is controlled to cause the transversal filter 73 to generate interference components, thereby minimizing the remaining interference components.

In the illustrative embodiment, the phase error correcting circuit 799 is connected to the input side where the error signals of the co-polar side arrive. Alternatively, the phase error correcting circuit 799 may be connected to the input side where the quadrant detection signals D′p and D′q from the 16 QAM demodulator 62 arrive. In such a case, the difference in phase between the quadrant detection signals and the error signals ascribable to the difference in phase between the carriers recovered by the individual demodulators will be corrected.

In FIG. 1, the interference canceller 72, like the interference canceller 71, has a delay circuit 733, a transversal filter 74, an adder 721, and a control signal generator 732. The interference canceller 72 differs from the interference canceller 71 regarding the delay of the delay circuit 733, the delays of delay circuits 728 to 731 built in the transversal filter 74, and the input to the control signal generator 732. Specifically, the delay circuit 733 has a delay which compensates for the delay particular to the transversal filter 74, while the delay circuits 728 to 731 each has a delay of $1/m \times B_1$ (m being an integer) which is the reciprocal of an integral multiple of the bandwidth of the cross-polar side, i.e. H-polar side. The control signal generator 732 receives the recovered carrier CARR, recovered clock signal CLK ($f_{S1}$) and quadrant detection signals Dp and Dq from the 64 QAM demodulator 61, and the recovered carrier CARR′ and error signals E′p and E′q from the 16 QAM demodulator 62. At this instant, the error signals E′p and E′q from the demodulator 62 are delayed by a shift register 82 which is operated at the timings of the recovered clock signal CLK from the 64 QAM demodulator 61, so that the difference in delay time between the 64 QAM and 16 QAM demodulators 61 and 62 may be compensated for. The rest of the construction and operation is identical with the horizontal polarization side, and redundant description will be avoided for simplicity.

In the illustrative embodiment, the quadrant detection signals D′p and D′q and error signals E′a and E′q from the 16 QAM demodulator 62 are delayed by the shift registers 81 and 82, on the assumption that the internal delay time of the 64 QAM demodulator 61 is longer than that of the 16 QAM demodulator 62. Alternatively, the output of either one of the demodulators having a shorter delay time than the other may be delayed by taking account of the internal delay time of each demodulator.

Figure 5:
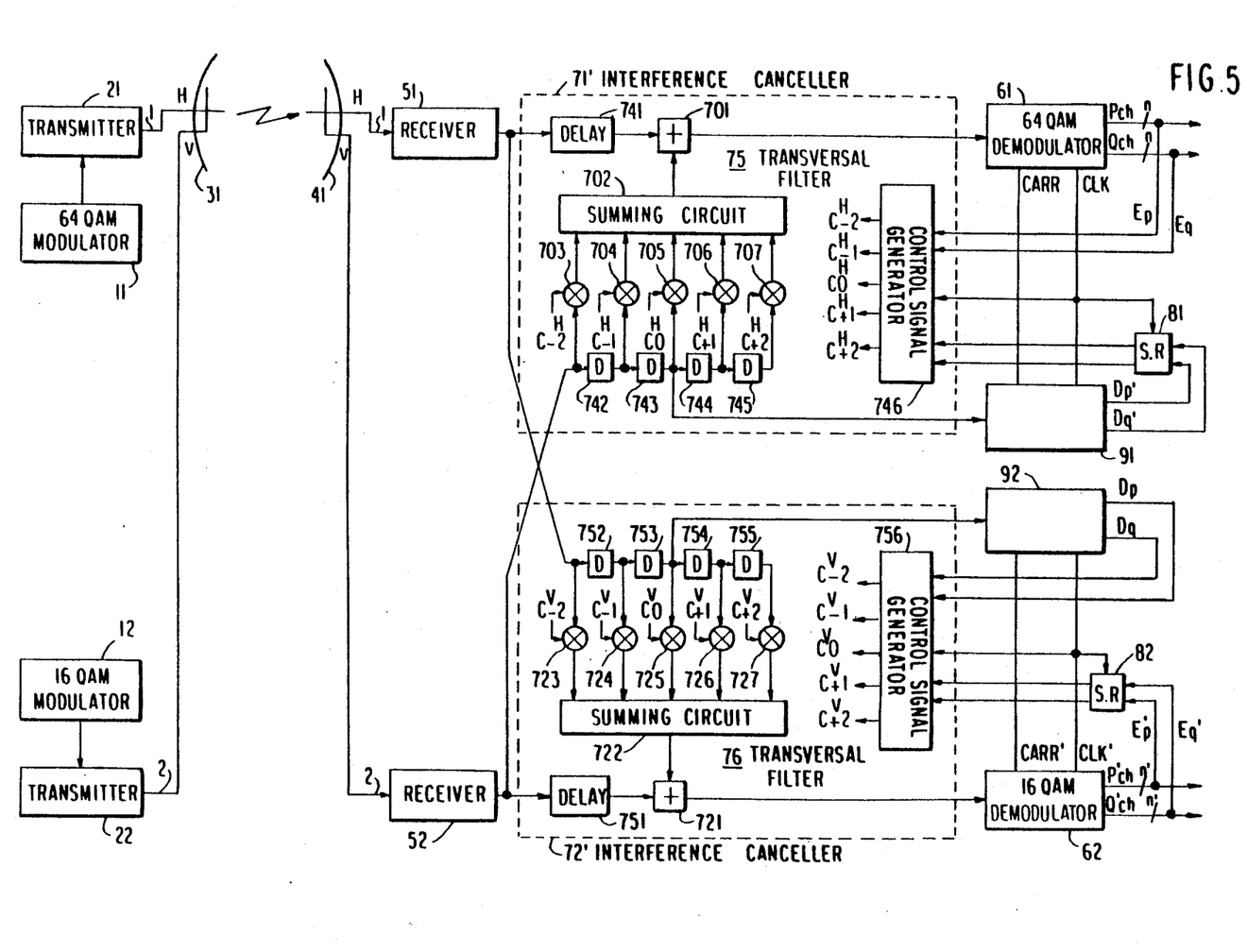
FIGS. 5 and 6 are schematic block diagrams each showing a different alternative embodiment of the present invention which, like the embodiment of FIG. 1, implements XPIC in the IF band.

In FIG. 5, an alternative embodiment of the present invention is shown. The following description will concentrate only on the portions of the alternative embodiment which are different from the previous embodiment. As shown, the alternative embodiment has an interference canceller 71′ which is constituted by a transversal filter 75 for generating interference components from the cross-polarized side, an adder 701 for adding the output of the transversal filter 75 and the output of a delay circuit 741 to produce a signal free from interference components, a control signal generator 746 for delivering weighting control signals to the transversal filter 75, and a delay circuit 741 for delaying the IF signal from the receiver 51 by the same delay time as the transversal filter 75. Delay circuits 742, 743, 744 and 745 arranged in the transversal filter 75 each has a delay of $1/n' \times B_1$ (n' being an integer greater than or a equal to 2) which is the reciprocal of the bandwidth of the co-polar side, i.e. the H-polarized side.

Why the transversal filter 75 can produce a desired corrected signal despite the delay of $1/n' \times B_1$ is as follows. A H- wave and a V- wave (or interference wave in this case) are respectively limited to $f_{S1}/2$ and $f_{S2}/2$ in the baseband. The signal to be generated by a transversal filter of an interference canceller is an approximate signal of an interference wave. According to the sampling theorem, an interference wave limited in band to the maximum frequency $f_{S2}/2$ can be fully represented by the values sampled by frequencies higher than $f_{S2}$. Hence, desired corrected signals are achievable only if the tap delays of the transversal filters incorporated in the individual interference cancellers are less than $1/f_{S2}$ of the interference wave. It follows that the delay of $1/n' \times B_1$ of the delay circuits 742 to 745 which is smaller than $1/f_{S2}$ is disirable. However, the delay of $1/B_1$ is acceptable if a little performance degradation is allowed.

The illustrative embodiment further includes demodulators 91 and 92 adapted for cross-polarized waves. Specifically, the demodulator 91 receives the output of the delay circuit 743 incorporated in the transversal filter 75, i.e., the V-polarized IF signal. The demodulator 91 demodulates the output of the delay circuit 743 by using the recovered carrier CARR and recovered clock signal CLK from the demodulator on the H-polar side, i.e., the 64 QAM demodulator 61, thereby producing quadrant detection signals D′p and D′q. The control signal generator 746 outputs weighting control signals in response to the recovered clock signal CLK and error signals Ep and Eq from the demodulator at the co-polar side, i.e., the 64 QAM demodulator 61 and the quadrant detection signals D′p and D′q from the demodulator 91. At this instant, the demodulator 91 demodulates the inputs by the recovered carrier CARR from the 64 QAM demodulator 61, so that the control signal generator 746 shown in FIG. 3 does not need a phase error correcting circuit. To correct the delay time difference between the two demodulators, it is necessary that either the error signals Ep and Eq from the demodulator 61 or the quadrant detection signals D′p and D′q from the demodulator 91 be delayed at the timings of the recovered clock signal CLK. In this particular embodiment, the quadrant detection signals D′p and D′q are delayed by the shift register 81, on the assumption that the internal delay of the demodulator 91 is small.

The interference canceller 72′ located at the V-polarized side is similar in construction to the interference canceller 71′ stated above. Specifically, the interference canceller 72′ has a transversal filter 76 made up of delay circuits 752 to 755 each having a delay of $1/m \times B_2$ (m being an integer) which is the reciprocal of an integral multiple of the bandwidth of the co-polar side, i.e., the V-polar side, weighting circuits 723 to 727, and a summing circuit 722. A delay circuit 751 delays the IF signal from the receiver 52 by a delay of the transversal filter 76. An adder 721 adds the output of the delay circuit 751 and the output of the transversal filter 76 to produce a signal free from interference components. The reference numeral 756 designates a control signal generator. The demodulator 92 demodulates and regenerates the output of the delay circuit 753 (H-polarized IF signal) by the recovered carrier CARR' and recovered clock signal CLK' from the 16 QAM demodulator 62 of the cross-polar side, thereby producing quadrant detection signals Dp and Dq.

The control signal generator 756 outputs weighting control signals $C_{-2}^V$, $C_{-1}^V$, $C_0^V$, $C_{+1}^V$ and $C_{+2}^V$ in response to the recovered clock signal CLK' and error signals E'p and E'q from the 16 QAM demodulator 62 and the quadrant detection signals Dp and Dq from the demodulator 92. The error signals E'p and E'q and quadrant detection signals Dp and Dq are applied to input terminals 798 and 797 of the control signal generator, in FIG. 3, and from which the phase correcting circuit is omitted. The shift register 82 delays the error signals E'p and E'q at the timings of the recovered clock signal CLK'.

This embodiment differs from the embodiment of FIG. 1 in that the tap delay of the transversal filter of the interference canceller located on the co-polar side is the reciprocal of an integral multiple of the bandwidth of the co-polar side, and in that the clock signal of co-polar side is fed to the control signal generator. In such a configuration, the outputs of the individual receivers suffice the interface between the H- and V-polarizations systems. Hence, when the demodulator on one of the opposite sides fails, the interference canceller associated with the different polarization is normally operable. Furthermore, in the case that each system is accommodated in an independent housing, a single connecting portion suffices.

Figure 6:
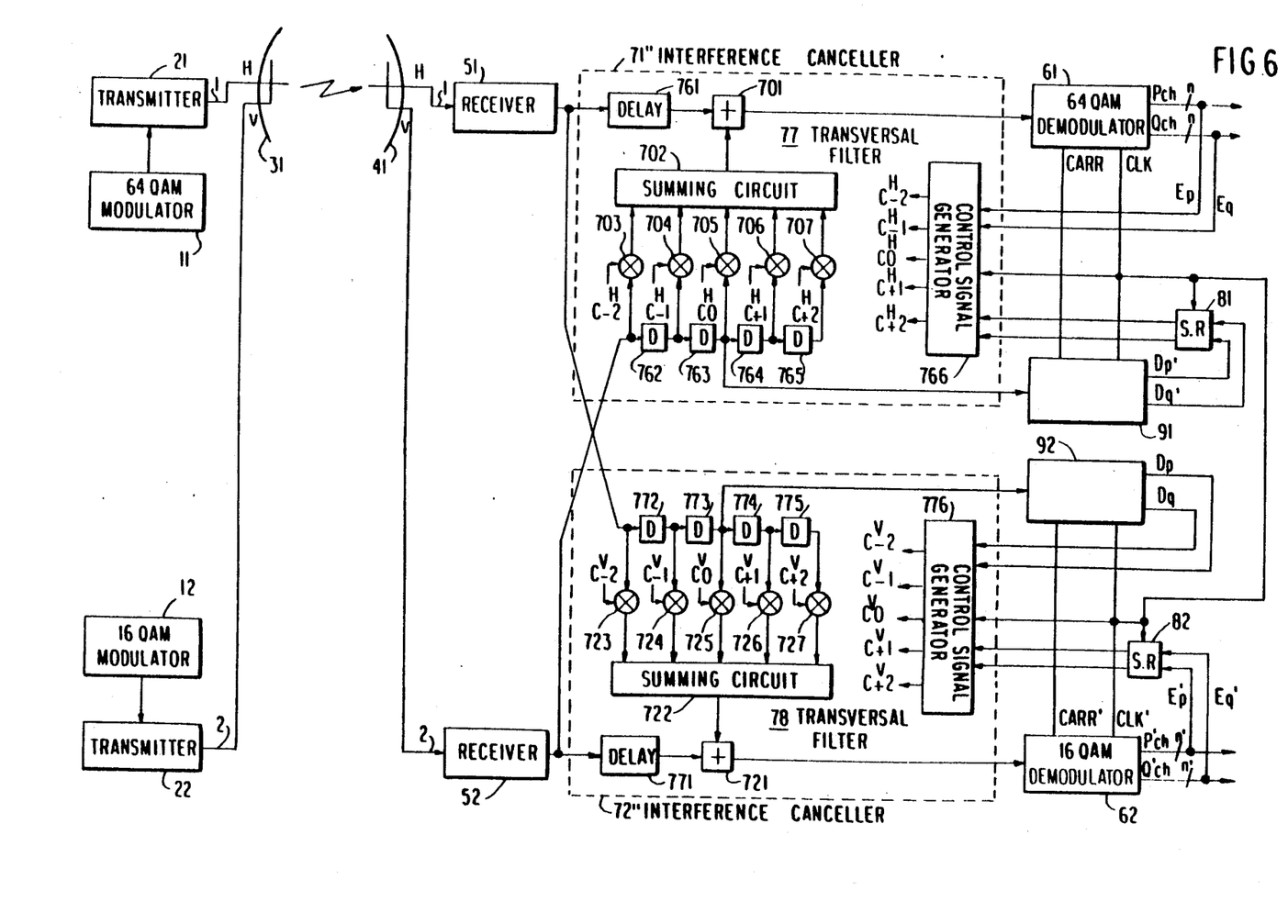

FIG. 6 shows another alternative embodiment of the present invention which is essentially similar to the embodiment of FIG. 5 except that delay circuits 762 to 765 and 772 to 775 incorporated in transversal filters 77 and 78, respectively, have delays each being the reciprocal of an integral multiple of the bandwidth of the H-polarized wave. Specifically, in FIG. 6, the delays of the delay circuits 762 to 765 and 772 to 775 each is the reciprocal $1/n' \times B_1$ (n' being an integer) of an integral multiple of the bandwidth of the H-polar side. The recover clock signal CLK from the 64 QAM modulator 61 is applied to the demodulator 92, control signal generator 776, and shift register 82. The delay circuit 771 has the same delay time as that of the transversal filter 77. Regarding the rest of the construction and operation, this embodiment is identical with the embodiment of FIG. 5.

The illustrative embodiment assigns a delay which is the reciprocal of an integral multiple of the bandwidth of the H-polar side to the delay circuits built in the two transversal filters, as stated above. Hence, the interference cancellers each being associated with particular polarization can be implemented with an identical construction.

While the embodiment of FIG. 6 has been shown and described as adopting the reciprocal of an integral multiple of the bandwidth of the horizontal polarization as the tap delay of both of the transversal filters, it may be replaced with the reciprocal of an integral multiple of the bandwidth of the vertical polarization. Then, the recovered clock of the V-polar side will be applied to the each of the control signal generators.

All the embodiments described so far cancel cross polarization interference in the IF band. The interference may alternatively be cancelled in the baseband, as will be described.

Figure 7:
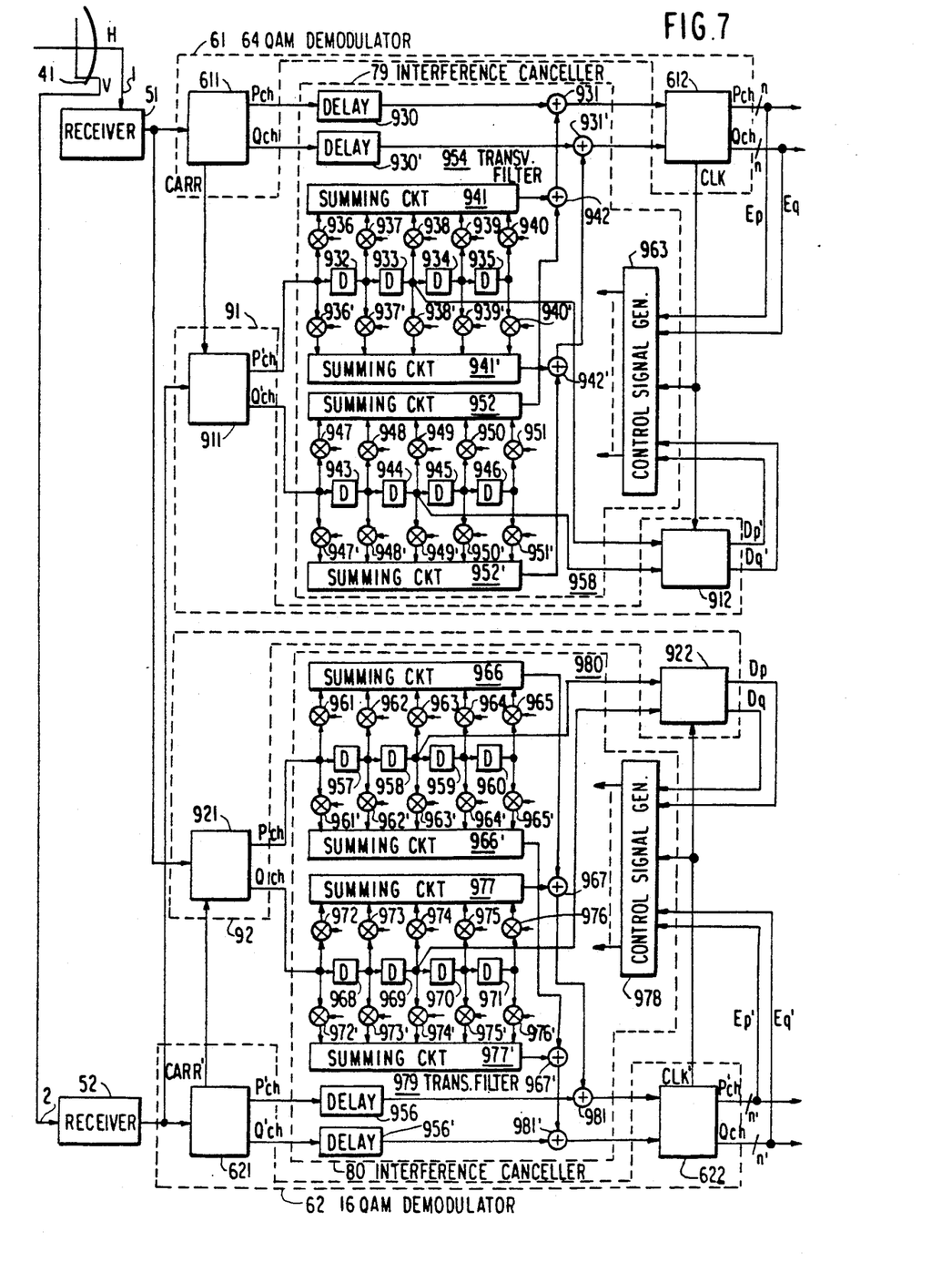
FIGS. 7 and 8 are schematic block diagrams each showing a different alternative embodiment of the present invention which implements XPIC in the baseband.

In FIG. 7, another alternative embodiment of the present invention is shown which cancels interference components ascribable to cross-polarized waves before the discrimination of data, i.e., in analog signals and in the baseband. FIG. 7 shows only the receiving side. A radio frequency signal coming in through the antenna 41 and having the bandwidth $B_1$ of the H-polar side is converted into an IF signal by the receiver 51 and then applied to the 64 QAM demodulator 61 and the demodulator 92 adapted for the cross-polar side. A radio frequency signal coming in through the antenna 41 and having the bandwidth $B_2$ of the V-polar side is converted into an IF signal by the receiver 52 and then applied to the 16 QAM demodulator 62 and the demodulator 91 adapted for the cross-polar side. The demodulators 61, 62, 91 and 92 are made up of orthogonal synchronous detectors 611, 621, 911 and 912 and discriminators 612, 622, 912 and 922, respectively.

The IF signals from the receivers 51 and 52 are respectively demodulated by orthogonal synchronous detectors 611 and 621 into P channel and Q channel signals of the baseband. At the same time, the IF signals from the receivers 51 and 52 are respectively applied to orthogonal synchronous detectors 921 and 911 to be thereby converted into P channel and Q channel signals of the baseband by the recovered carriers CARR and CARR' adapted to 64 QAM and 16 QAM. The output signals of the orthogonal synchronous detectors 611 and 621 are respectively routed through interference cancellers 79 and 80 to the discriminators 612 and 622 and thereby converted into baseband digital signals. The output signals of the orthogonal synchronous detectors 911 and 912 are also routed through the interference cancellers 79 and 80 to the discriminators 912 and 922, respectively. In response, the discriminators 912 and 922 convers their inputs into digital signals by discriminating then by the 64 QAM recovered clock signal CLK and the 16 QAM recovered clock signal CLK', respectively.

The interference canceller 79 has transversal filters 954 and 955 to which the P channel and Q channel outputs of the orthogonal synchronous detector 911 respectively are applied. Adders 942 and 942' receive the outputs of the transversal filters 954 and 955, respectively. Delay circuits 930 and 930' delay respectively the P channel and Q channel outputs of the detector 611. An adder 931 adds the output of a delay circuit 930 and the output of the adder 942, while an adder 931' adds the output of a delay circuit 930' and the output of the adder 942'. The resulting outputs of the adders 931 and 931' are fed to a discriminator 612. The reference numeral 953 designates a control signal generator.

Delay circuits 932 to 935 and delay circuits 943 to 946 incorporated in the transversal filters 954 and 955, respectively, each are connected in series and have a delay which is the reciprocal $1/n \times B_1$ (n being an integer) of an integral multiple of the bandwidth of the horizontal polarization. The P channel and Q channel outputs of the orthogonal synchronous detector 911 are connected to the delay circuits 932 and 943, respectively. The output of the detector 911 and the outputs of the delay circuits 932, 933, 943 and 935 are fed to weighting circuits 936, 937, 938, 939 and 940, respectively. The weighting circuits 936 to 940 each delivers to a summing circuit 941 a weighted signal which is proportional to a control signal fed from the control signal generator 953. At the same time, the output of the detector 911 and the outputs of the delay circuits 932, 933, 934 and 935 are delivered to weighting circuits 936', 937', 938', 939' and 940', respectively. In response, the weighting circuits 936' to 940' each feeds to a summing circuit 941' a weighted signal which is proportional to a control signal fed from the control signal generator 953.

Further, the output of the detector 911 and the outputs of the delay circuits 943 to 946 are fed to weighting circuits 947 to 951 and 947' to 951'. In response, the weighting circuits 947 to 951 and 947' to 951' deliver to summing circuits 952 and 952', respectively, weighted signals which are proportional to control signals fed from the control signal generator 953. As a result, an interference component from the P channel of the 16 QAM modulated signal to the P channel of the 64 QAM modulated signal, an interference component from the P channel of the 16 QAM modulated signal to the Q channel of the 64 QAM modulated signal, an interference component from the Q channel of the 16 QAM modulated signal to the P channel of the 64 QAM modulated signal, and an interference component from the Q channel of the 16 QAM modulated signal to the Q channel of the 64 QAM modulated signal appear on the output terminals of the summing circuits 941, 941', 952 and 952', respectively.

More specifically, the correlations between the error signals of the co-polar side and the quadrant detection signals of the cross-polar side are detected to estimate interference components from the cross-polar side of the P channel of the co-polar side remaining in the output of the adder 931. By such estimation, the tap coefficient is controlled to cause the transversal filter to generate interference components such that the remaining interference components are minimized. Likewise, the transversal filter is caused to generate interference components such that the interference components from the cross-polar side to the Q channel of the co-polar side remaining in the output of the adder 931'.

An adder 942 adds the outputs of the summing circuits 941 and 952, i.e., the interference components to the P channel of the 64 QAM modulated signal, while an adder 942' adds the outputs of the summing circuits 941' and 952', i.e., the interference components to the Q channel of the 64 QAM modulated signal.

Adders 931 and 931' add respectively the P channel and Q channel outputs of the orthogonal synchronous detectors 611 routed through the delay circuits 930 and 930' and the outputs of the adders 942 and 942'. The outputs of the adders 931 and 931' which are free from interference components are applied to the discriminator 612.

The delay circuits 930 and 930' compensate for the difference in delay time between the route extending from the receiver 51 to the adders 931 and 931' via the orthogonal synchronous detector 611 and the route extending from the receiver 52 to the adders 931 and 931' via the orthogonal synchronous detector 911 and transversal filters 954 and 955.

Signals appearing on the center taps of the transversal filters 934 and 955 are applied to the discriminator 912. In response, the discriminator 912 outputs quadrant detection signals D'p and D'q in synchronism with the recovered clock fed thereto from the discriminator 612.

The quadrant detection signals D'p and D'q from the discriminator 912 are delivered to the control signal generator 953 together with the recovered clock signal CLK and, error signals Ep and Eq among the baseband digital signal from the discriminator 612. Based on these signals, the control signal generator 953 produces weighting control signals by the previously stated method.

An interference canceller 80 is constructed in the same manner as the interference canceller 79 except for the differences which will be described. Specifically, delay circuits 957 to 960 and 968 to 971 incorporated in the interference canceller 80 each has a delay which is the reciprocal $1/m \times B_2$ (m being an integer) of an integral multiple of the bandwidth assigned to the V-polar side. Delay circuits 956 and 956' compensate for the difference in delay time between the route extending from the receiver 52 to the adders 981 and 981' via the orthogonal synchronous detector 621 and the route extending from the receiver 51 to the adders 981 and 981' via the orthogonal synchronous detector 921 and transversal filters 979 and 980.

Figure 8:
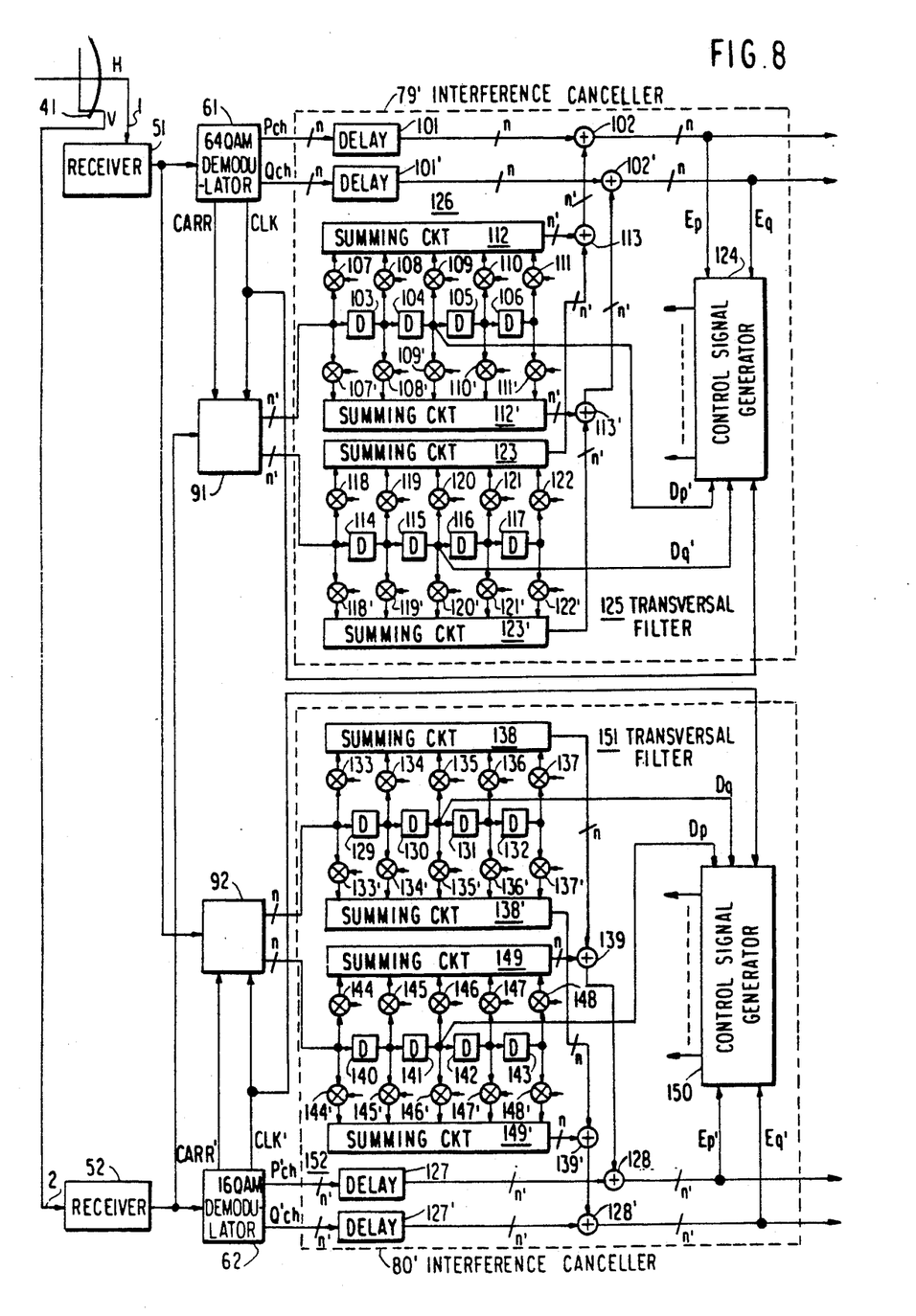

FIG. 8 shows another alternative embodiment of the present invention which executes digital processing in the baseband. In FIG. 8, like in FIG. 7, only the receiver side is shown. A radio frequency signal coming in through the antenna 41 and having the bandwidth $B_1$ assigned to the H-polar side is converted into an IF signal by the receiver 51 and then fed to the 64 QAM demodulator 61 and the demodulator 92 adapted for the cross-polar side. A radio frequency signal also coming in through the antenna 41 and having the bandwidth $B_2$ assigned to the V-polar side is converted into an IF signal by the receiver 52 and then applied to the 16 QAM demodulator 62 and the demodulator 91 adapted for the cross-polar side.

The P channel and Q channel baseband digital signals demodulated and regenerated by the 64 QAM demodulator 61 are applied respectively to delay circuits 101 and 101' which are included in an interference canceller 79'. The input to the demodulator 91 is demodulated and regenerated in response to the recovered carrier CARR and recovered clock signal CLK from the 64 QAM demodulator 61 and then fed to transversal filters 125 and 126.

Delay circuits 103 to 106 and 114 to 117 included in the transversal filters 125 and 126, respectively, each has a delay which is the reciprocal $1/n \times B_1$ (n being an integer) of an integral multiple of the bandwidth assigned to the H-polar side.

The P channel baseband digital signal from the demodulator 91 and the outputs of the delay circuits 103, 104, 105 and 106 are applied respectively to the weighting circuits 107 to 111 and 107' to 111'. The weighting circuits 107 to 111 and 107' to 111' each produces a weighted signal proportional to a weighting control signal and feeds it to associated one of summing circuits 112 and 112'. Likewise, the Q channel baseband digital signal from the demodulator 91 and the outputs of the delay circuits 114 to 117 are fed respectively to weighting circuits 118 to 122 and 118' to 122'. The weighting circuits 118 to 122 and 118' to 122' each produces a weighted signal proportional to a weighting control signal and delivers it to associated one of summing circuits 123 and 123'.

An adder 102 adds the P channel baseband digital signal from the 64 QAM demodulator 61 routed though the delay circuit 101 and the output of an adder 113 which is the sum of the summing circuits 112 and 123. Likewise, an adder 102' adds the Q channel baseband digital signal from the 64 QAM demodulator 61 routed through the delay circuit 101' and the output of an adder 113' which is the sum of the summing circuits 112' and 123'. The adders 102 and 102', therefore, produce signals which are free from interference components.

A control signal generator 124 receives the recovered clock signal CLK from the 64 QAM demodulator 61, error signals Ep and Eq included in the outputs of the adders 102 and 102', and quadrant detection signals D'p and D'q included in the outputs of the center taps of the transversal filters 125 and 126. In response, the control signal generator 124 produces control signals meant for the weighting circuits 107 to 111, 107' to 111', 118 to 122, and 118' to 122'.

An interference canceller 80', like the interference canceller 79', removes from the output of the 16 QAM demodulator 62 the interference components from the cross-polar side which are produced from the output of the demodulator 92. Delay circuits 129 to 132 and 140 to 143 included in transversal filters 151 and 152, respectively, each has a delay which is the reciprocal $1/m \times B_2$ (m being an integer) of an integral multiple of the bandwidth assigned to the V-polar side.

In the illustrative embodiments of FIGS. 7 and 8 which cancel cross polarization interference in the baseband, it is assumed that the transversal filters included in the interference cancellers each has a tap interval equal to the reciprocal of an integral multiple of the bandwidth of the co-polar side. In practice, however, three different tap intervals are available as previously stated in relation to the interference cancellation in the IF band, i.e., the reciprocal of the bandwidth assigned to the co-polar side, the reciprocal of the bandwidth assigned to the cross-polar side, and either one of them.

It is to be noted that the present invention is practicable with any suitable multi-level QAM modulated signals other than the 64 QAM and 16 QAM modulated signals shown and described. It is also to be noted that the present invention is practicable with phase shift keying (PSK) modulated signals.

In summary, in a dual polarization transmission system of the type transmitting digital modulated signals having different bandwidths by radio waves which have the same center frequency and are different in polarization, the present invention has interference cancellers capable of cancelling interference components introduced from the cross-polar side into the received signal of the co-polar side. The present invention, therefore, frees demodulated signals from degradation in quality.

Either one of error signals of the co-polar side applied to a control signal generator included in each interference canceller and quadrant detection signals of the cross-polar side is delayed by a shift register. This is successful in compensating for a difference in internal delay between demodulators assigned to opposite polarization sides.

The embodiment shown in FIG. 1 is practicable with a simple construction partly because delay circuits incorporated in transversal filters assigned to opposite polarization sides each has a delay which is the reciprocal of an integral multiple of the bandwidth of the cross-polar side and partly because use is not made of a demodulator adapted for the cross-polar side.

In the embodiment of FIG. 5, each transversal filter assigned to a particular polarization side has delay circuits whose delay is the reciprocal of an integral multiple of the bandwidth of the co-polar side, and a demodulator for the cross-polar side is associated with each of the opposite polarization sides. This allows a 64 QAM and a 16 QAM system to be interfaced at a single point of each receiver. Hence, even when one demodulator fails, it does not affect the interference canceller of the cross-polar side.

Further, the embodiment shown in FIG. 6 implements interference cancellers of opposite polarization sides with an identical configuration since delay circuits built in transversal filters each has a delay which is the reciprocal of an integral multiple of the bandwidth of one polarization side.

What is claimed is:

1. A dual polarization transmission system for transmitting digital modulated signals having different bandwidths and the same center frequency, said signals being orthogonal in polarization to each other, said system comprising at a receiver side:
   first receiving means for converting a first polarized transmitted signal into a first IF signal;
   second receiving means for converting a second polarized transmitted signal into a second IF signal;
   canceller means for removing a second polarized interference component from said first IF signal to deliver an interference cancelled signal;
   first detecting means responsive to said interference cancelled signal for detecting a first polarized error signal representative of discrimination error for a first polarized regenerated data signal;
   second detecting means responsive to said second IF signal for detecting a quadrant detection signal including at least a most significant bit of a second polarized regenerated data signal;
   control signal generating means for generating a weighting control signal from said first polarized error signal and said quadrant detection signal; and
   a transversal filter applied with said second IF signal and having a tap delay corresponding to a reciprocal of an integral multiple of the bandwidth assigned to the first polarized transmitted signal for generating said second polarized interference component which is weighted in proportion to said weighting control signal.

2. A system as claimed in claim 1, further comprising delaying means for delaying either one of said first polarized error signal and said quadrant detection signal to produce a delayed signal, and for delivering said delayed signal to said control signal generating means.

3. A dual polarization transmission system for transmitting digital modulated signals having different bandwidths and the same center frequency, said signals being orthogonal in polarization to each other, said system comprising at a receiver side:
   first receiving means for converting a first polarized transmitted signal into a first IF signal;
   second receiving means for converting a second polarized transmitted signal into a second IF signal;
   canceller means for removing a second polarized interference component from said first IF signal to deliver an interference cancelled signal;
   first detecting means responsive to said interference cancelled signal for detecting a first polarized error signal representative of discrimination error for a first polarized regenerated data signal;
   second detecting means responsive to said second IF signal for detecting a quadrant detection signal including at least a most significant bit of a second polarized regenerated data signal;
   control signal generating means for generating a weighting control signal from said first polarized error signal and said quadrant detection signal; and a transversal filter applied with said second IF signal and having a tap delay corresponding to a reciprocal of an integral multiple of either one of the bandwidths assigned to the first polarized and second polarized signals having a narrower bandwidth than the other for generating said second polarized interference component which is weighted in proportion to said weighting control signal.

4. A system as claimed in claim 3, further comprising delaying means for delaying either one of said first polarized error signal and said quadrant detection signal to produce a delayed signal, and for delivering said delayed signal to said control signal generating means.

5. A dual polarization transmission system for transmitting digital modulated signals having different bandwidths and the same center frequency, said signals being orthogonal in polarization to each other, said system comprising at a receiver side:

first receiving means for converting a first polar transmitted signal into a first IF signal;

second receiving means for converting a second polar transmitted signal into a second IF signal;

first canceller means for removing a second-polar interference component from said first IF signal to deliver a first interference cancelled signal;

second canceller means for removing a first-polar interference component from said second IF signal to deliver a second interference cancelled signal;

first detecting means responsive to said first interference cancelled signal for detecting a first quadrant detection signal including at least a first most significant bit of a first regenerated data signal and a first error signal representative of discrimination error for said first regenerated data signal;

second detecting means responsive to said second interference cancelled signal for detecting a second quadrant detection signal including at least a second most significant bit of a second regenerated data signal and a second error signal representative of discrimination error for said second regenerated data signal;

first control signal generating means for generating a first weighting control signal from said first error signal and said second quadrant detection signal;

second control signal generating means for generating a second weighting control signal from said second error signal and said first quadrant detection signal;

first transversal filter applied with said second IF signal and having a first tap delay which corresponds to a reciprocal of an integral multiple of the bandwidth assigned to the second-polarized for generating said second-polar interference component which is weighted in proportion to said first weighting control signal; and second transversal filter applied with said first IF signal and having a second tap delay which corresponds to a reciprocal of an integral multiple of the bandwidth assigned to the first-polarized signal and is different from said first tap delay for generating said first-polar interference component which is weighted in proportion to said second weighting control signal.

6. A system as claimed in claim 5, further comprising delaying means for delaying either one of said first error signal and said second quadrant detection signal to produce a delayed signal, and for delivering said delayed signal to said first control signal generating means.

7. A system as claimed in claim 5, further comprising delaying means for delaying either one of said second error signal and said first quadrant detection signal to produce a delayed signal, and for delivering said delayed signal to said second control signal generating means.

8. A dual polarization transmission system for transmitting radio frequency signals each having one of a first and a second bandwidth, said signals being transmitted by first and second polarized waves which have a same center frequency and are orthogonal in polarization to each other, said system comprising at a receiver side:

first receiving means for converting the radio frequency signal having the first bandwidth and transmitted by the first polarized wave into a first IF signal;

second receiving means for converting the radio frequency signal having the second bandwidth and transmitted by the second polarized wave into a second IF signal;

first detecting means for demodulating said first IF signal to produce a first demodulated signal and for detecting an error signal representative of discrimination error for said first demodulated signal;

second detecting means for demodulating said second IF signal to produce a second demodulated signal and for detecting a quadrant detection signal including at least a most significant bit of said second demodulated signal;

control signal generating means for generating a weighting control signal from said error signal and said quadrant detection signal;

a transversal filter applied with said second demodulated signal and having a tap delay which corresponds to a reciprocal of an integral multiple of the bandwidth assigned to said first polarized wave for generating a second-polar interference component which is weighted in proportion to said weighting control signal; and canceller means for removing said second-polar interference component from said first demodulated signal to deliver a cross polarization interference cancelled signal.

9. A dual polarization transmission system for transmitting digital modulated signals having either one of a first and a second bandwidth transmitted by a respective one of a first and a second polarized waves which have a same center frequency and are orthogonal in polarization to each other, said system comprising at a receiver side:

first receiving means for converting the radio frequency signal having the first bandwidth and transmitted by the first polarized wave into a first IF signal;

second receiving means for converting the radio frequency signal having the second bandwidth and transmitted by the second polarized wave into a second IF signal;

first detecting means for demodulating said first IF signal to produce a first demodulated signal and for detecting an error signal representative of discrimination error for said first demodulated signal;

second detecting means for demodulating said second IF signal to produce a second demodulated signal and for detecting a quadrant detection signal including at least a most significant bit of said second demodulated signal;

control signal generating means for generating a weighting control signal from said error signal and said quadrant detection signal;

a transversal filter applied with said second demodulated signal and having a tap delay which corresponds to a reciprocal of an integral multiple of either one of the bandwidths assigned to said first polarized and second polarized waves having a narrower bandwidth than the other for generating a second-polar interference component which is weighted in proportion to said weighting control signal; and canceller means for removing said second-polar interference component from said first demodulated signal to deliver a cross polarization interference cancelled signal.

10. A dual polarization transmission system for transmitting digital modulated signals each, having a respective one of a first and a second bandwidth, by first and second polarized waves which have the same center frequency and are orthogonal in polarization to each other, said system comprising at a receiver side:

first receiving means for converting the modulated signal having the first bandwidth and transmitted by the first polarized wave into a first IF signal;

second receiving means for converting the modulated signal having the second bandwidth and transmitted by the second polarized wave into a second IF signal;

first detecting means for demodulating said first IF signal to produce a first demodulated signal and for detecting a first error signal representative of discrimination error for said first demodulated signal and for detecting a first quadrant detection signal including at least a most significant bit of said first demodulated signal;

second detecting means for demodulating said second IF signal to produce a second demodulated signal and for detecting a quadrant detection signal including at least a most significant bit of said second demodulated signal and a second error signal representative of discrimination error for said second demodulated signal;

first control signal generating means for generating a first weighting control signal from said first error signal and said second quadrant detection signal;

second control signal generating means for generating a second weighting control signal from said second error signal and said first quadrant detection signal;

first transversal filter applied with said second demodulated signal and having a first tap delay which corresponds to a reciprocal of an integral multiple of the bandwidth assigned to said second polarized wave for generating a second-polar interference component which is weighted in proportion to said first weighting control signal;

second transversal filter applied with said first demodulated signal and having a second tap delay which corresponds to a reciprocal of an integral multiple of the bandwidth assigned to said first polarized wave and is different from said first tap delay for generating a first-polar interference component which is weighted in proportion to said second weighting control signal;

first canceller means for removing said second-polar interference component from said first demodulated signal to deliver a cross polarization interference cancelled signal; and second canceller means for removing said first-polar interference component from said second demodulated signal to deliver a cross polarization interference cancelled signal.

* * * * *

UNITED STATES PATENT AND TRADEMARK OFFICE
CERTIFICATE OF CORRECTION

PATENT NO. : 5,075,697

DATED : December 24, 1991

INVENTOR(S) : Yutaka KOIZUMI and Shigeki MAEDA

It is certified that error appears in the above-identified patent and that said Letters Patent is hereby corrected as shown below:

Col. 4, line 46, delete "Ep and Eq", insert --$\overline{Ep}$ and $\overline{Eq}$--;

Col. 4, line 62, delete "$C_+$", insert --$C_{+2}$--;

Col. 8, line 34, delete "convers", insert --converts--;

Col. 10, line 62, delete "though", insert --through--.

Signed and Sealed this

Fifth Day of October, 1993

BRUCE LEHMAN

*Attest:*

*Attesting Officer*  Commissioner of Patents and Trademarks